(12) United States Patent
Lee et al.

(10) Patent No.: US 10,860,012 B2
(45) Date of Patent: Dec. 8, 2020

(54) KPI CALCULATION RULE BUILDER FOR ADVANCE PLANT MONITORING AND DIAGNOSTICS

(71) Applicant: YOKOGAWA ENGINEERING ASIA PTE. LTD, Singapore (SG)

(72) Inventors: Ching Hua Lee, Singapore (SG); Zhong Shen, Singapore (SG); Loovies Sebastian Arackal, Singapore (SG); Bo Bin Chng, Singapore (SG)

(73) Assignee: YOKOGAWA ENGINEERING ASIA PTE. LTD, Singapore (SG)

( * ) Notice: Subject to any disclaimer, the term of this patent is extended or adjusted under 35 U.S.C. 154(b) by 459 days.

(21) Appl. No.: 15/347,127

(22) Filed: Nov. 9, 2016

(65) Prior Publication Data
US 2018/0129195 A1 May 10, 2018

(51) Int. Cl.
G05B 23/02 (2006.01)
G05B 23/00 (2006.01)
G06Q 10/00 (2012.01)
G05B 19/4063 (2006.01)

(52) U.S. Cl.
CPC ..... *G05B 23/0259* (2013.01); *G05B 19/4063* (2013.01); *G05B 23/00* (2013.01); *G06Q 10/20* (2013.01); *G05B 2219/31368* (2013.01); *G05B 2219/50185* (2013.01)

(58) Field of Classification Search
CPC ............ G05B 19/4063; G05B 23/0259; G05B 23/0297; G05B 23/0235; G06Q 10/20; G06Q 10/06393; G06F 11/008; Y04S 10/54

USPC ................................. 703/4; 702/183; 705/39
See application file for complete search history.

(56) References Cited

U.S. PATENT DOCUMENTS

| | | |
|---|---|---|
| 2004/0019461 A1 | 1/2004 | Bouse et al. |
| 2010/0293220 A1 | 11/2010 | Gennari et al. |
| 2011/0153236 A1 | 6/2011 | Montreuil et al. |
| 2014/0046881 A1 | 2/2014 | Losl et al. |
| 2014/0336984 A1* | 11/2014 | Starr .................. G05B 23/0297 702/183 |
| 2017/0185078 A1* | 6/2017 | Weast ..................... H04W 4/80 |
| 2017/0309094 A1* | 10/2017 | Farahat ................. G06Q 10/06 |

FOREIGN PATENT DOCUMENTS

JP 2005032030 A 2/2005
WO 2016/081954 A1 5/2016

OTHER PUBLICATIONS

Communication dated Apr. 7, 2017 from the European Patent Office in counterpart Application No. 17152936.5.
(Continued)

*Primary Examiner* — Mouloucoulaye Inoussa
(74) *Attorney, Agent, or Firm* — Sughrue Mion, PLLC

(57) ABSTRACT

A system and a method related to a key performance indicator (KPI) analysis system with a KPI rules builder and a method to generate configurable diagnostic KPI rules. The diagnostic engine for the KPI analysis system can be set up for easy usage by a user without detailed knowledge of specific sensor parameters in relation to the KPI rules. Instead, the KPI rules builder may provide a high level, abstract, organizational interface for generating KPI rules without specific preset correspondence of sensors to KPI rules.

12 Claims, 9 Drawing Sheets

(56) References Cited

OTHER PUBLICATIONS

Written Opinion dated Mar. 17, 2020 from the Intellectual Property Office of Singapore in application No. 10201700509S.
Communication dated Jun. 9, 2020 in European Application No. 17152936.5.

\* cited by examiner

KPI CALCULATION RULE BUILDER FOR ADVANCE PLANT MONITORING AND DIAGNOSTICS

FIELD OF THE INVENTION

Exemplary embodiments relate to key performance indicator evaluation or diagnostic systems and methods, the monitoring of industrial automation processes, and the automatic diversion of a flow path of an industrial process through an alternative equipment or flow path.

BACKGROUND

In the related art concerning industrial plant environments, it is important to monitor and maintain the operability of processes and workflows. One way of monitoring processes and workflows in industrial plant environments is to use sensors for detecting the operating parameters. These sensors may be field devices in a detection network including a central server. However, equipment will degrade or fail over time. Equipment will degrade simply due to extended periods of deployment in the field. As time goes on, abnormal readings may occur.

If abnormalities occur, the process may have to be shut down for evaluation and repair. This would result in unplanned downtime and financial loss for a customer. Generally, under preset key performance indicator (KPI) diagnostics, the KPI consideration is directly tied to manually preset sensor readings. If a KPI is abnormal, an engineer or technician may be required to physically inspect the equipment for errors. In a large plant or process, the engineer may be required to check a large number of equipment in an attempt to identify the specific failure point.

SUMMARY

One or more embodiments of the present application is directed towards a system and a method related to a key performance indicator (KPI) analysis system with a KPI rules builder and a method to generate configurable diagnostic KPI rules. The diagnostic engine for the KPI analysis system can be set up for easy usage by a user without detailed knowledge of specific sensor parameters in relation to the KPI rules. Instead, the KPI rules builder may provide a high level, abstract, organizational interface for generating KPI rules without specific preset correspondence of sensors to KPI rules. Additionally, the present application is directed towards the automatic diversion of a flow path of an industrial process through an alternative flow path when the diagnostic system recognizes an equipment abnormality. The ability to automatically divert a flow path of an industrial process through an alternative equipment based on the output of the diagnostic tool leads to desired system improvement. By performing the diagnostic, prediction can be done to diagnose the health or the degree of degradation of equipment. This can allow for early maintenance or replacement of equipment that are beginning to fail or operate outside of normal ranges.

One or more embodiments of the disclosure relate to a method for configuring analysis of equipment operational anomalies in an industrial process. The method may include acquiring information regarding a plurality of equipment, determining a subset of available sensors for acquiring data, determining a set of required sensor outputs for implementing an analysis calculation, comparing the subset of available sensors with the set of required sensors to identify a common sensor, generating an analysis calculation rule, and determining an operations metric for the corresponding calculation rule.

Also, the method may further include evaluating the operational state of the equipment by comparing an output result of the operations metric and analysis calculation rule with a preset threshold alert value.

Embodiments of the method may also include automatically diverting a flow path of the industrial process through another equipment when the output result exceeds the preset threshold alert value.

In addition, the method may include mapping an output parameter of the common sensor with the set of required sensor outputs and checking if the output parameter of the common sensor matches the required sensor outputs.

Also, the method may further include wherein alternative sensors and output parameters are considered with a different analysis calculation rule if the output parameter does not match every required sensor output.

Embodiments of the method may also alert a user if the output result exceeds the preset threshold alert value.

Embodiments may include wherein the information regarding a plurality of equipment comprises logical information regarding a hierarchical level of the plurality of equipment within the industrial process. The plurality of sensors are coupled/attached to the plurality of equipment.

Also, the method may include automatically adjusting an input variable of the industrial process when the output result exceeds the preset threshold alert value in order to correct the excessive output result.

One or more embodiments of the disclosure relate to a system for configuring analysis of equipment operational anomalies in an industrial process. The system includes a plurality of equipment and sensors, at least one non-transitory computer readable storage medium operable to store program code, and at least one processor operable to read the program code and operate as instructed by the program code. The program code includes acquiring information regarding the plurality of equipment, determining a subset of available sensors for acquiring data, determining a set of required sensor outputs for implementing an analysis calculation, comparing the subset of available sensors with the set of required sensors to identify a common sensor, generating an analysis calculation rule, and determining an operations metric for the corresponding calculation rule.

Additionally, the program code may include evaluating the operational state of the equipment by comparing an output result of the operations metric and analysis calculation rule with a preset threshold alert value.

In addition, the program code may include automatically diverting a flow path of the industrial process through another equipment when the output result exceeds the preset threshold alert value.

Also, the program code may further include mapping an output parameter of the common sensor with the set of required sensor outputs and checking if the output parameter of the common sensor matches the required sensor outputs.

Furthermore, the program code may include considering alternative sensors and output parameters for a different analysis calculation rule if the output parameter does not match every required sensor output.

In addition, the program code may include alerting a user if the output result exceeds the preset threshold alert value.

Embodiments of the system may include wherein the information regarding a plurality of equipment comprises logical information regarding a hierarchical level of the plurality of equipment within the industrial process.

Also, the program code may include automatically adjusting an input variable of the industrial process when the output result exceeds the preset threshold alert value in order to correct the excessive output result.

DETAILED DESCRIPTION

Figure 1:
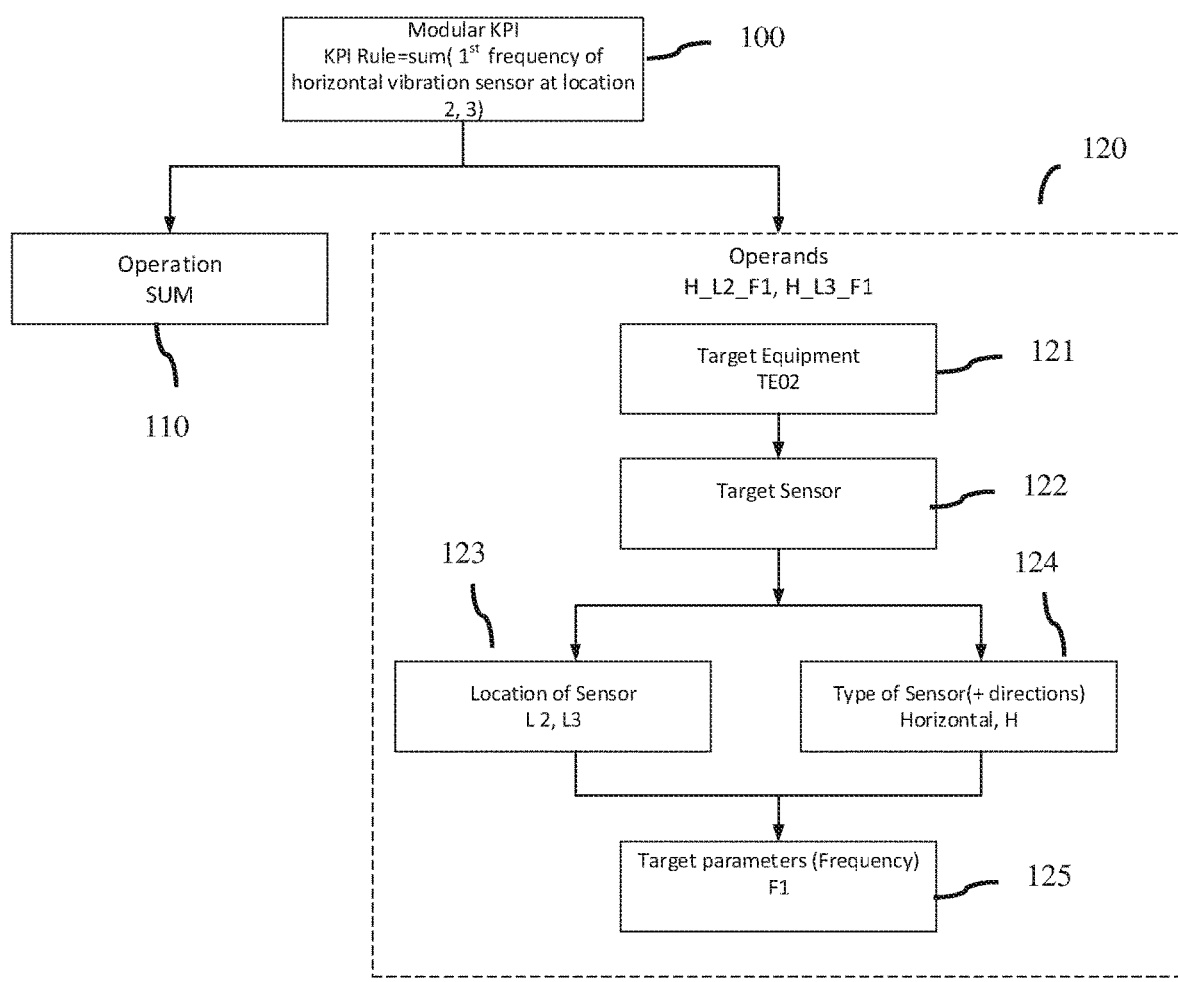
FIG. 1 illustrates an exemplary flowchart for application of the modules of the KPI analysis system.

Embodiments will be described below in more detail with reference to the accompanying drawings. The following detailed descriptions are provided to assist the reader in gaining a comprehensive understanding of the methods, apparatuses, and/or systems described herein, and equivalent modifications. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

One or more embodiments of the present application are directed towards a modular key performance indicator (KPI) analysis system. The KPI analysis system may be configured for plant performance diagnostics to evaluate whether an equipment for a process or work flow are operating abnormally. Embodiments of the modular, configurable KPI analysis system can provide simple configurability, management, and maintenance of diagnostics based on KPI.

One or more embodiments of the present application are directed towards a KPI analysis system with a KPI rules builder and a method to generate configurable diagnostic KPI rules. In this way, a diagnostic engine for the KPI analysis system can be set up for easy usage by a user without detailed knowledge of specific sensor parameters in relation to the KPI rules. Instead, the KPI rules builder may provide a high level, abstract, organizational interface for generating KPI rules without specific preset correspondence of sensors to KPI rules. In doing so, the complexity of the KPI analysis system is reduced for the user to effectively diagnose the process or flow path.

Embodiments of the present application may automatically look up sensors that correspond to needed input parameters to a KPI rule. Users would only need to select a generic high level KPI rule, rather than look at each specific preset input parameter to a KPI rule and manually set the input. For different types of equipment, there are different parameters used for the KPI rules, depending on the equipment type, sensor type, and process condition. To modify existing rules or to introduce new rules with the KPI rules builder, users do not need to understand and identify relevant input parameters to build the complex diagnostic rules. Instead, the user would only need to define a generic, high level rule configuration. Based on the selected rule configuration, the equipment type, sensor type, and process condition can be automatically applied to the generic high level rule for automatic customization.

In this way, users can easily change or update the diagnostic KPI rules as the KPI rules builder can update the KPI rule with the necessary input parameters based on the user's high level selection. Every time there is a change in the plant equipment and its parameters, the user would only need to update the high level configuration. The KPI rules builder can then generate a new KPI rule with the necessary input parameters based on the new configuration for KPI calculations.

KPI can be calculated using the generated KPI rule and real time or previously saved input parameter data. The calculated KPI can then be compared to a predetermined threshold range for operability. The threshold range may be preset from information known about the equipment and operation process or it may be based on historical stored data. In the case of historical stored data, magnitudes of standard deviation or other mathematical formulas may be used to establish the threshold range. When the calculated KPI is out of range, the KPI diagnostic system can then easily determine which parameter is out of the predetermined threshold range limits. The predetermined limits for parameters of equipment can be stored in a database, and can be stored in a non-transitory computer readable storage medium.

Embodiments of the modular KPI analysis system may operate based on an operation module and an operands module. The operation module includes the target operation or operation rule from a database. The operands module includes information on the sensors and equipment in the process. The information includes the output parameters of the sensors and specific information regarding the sensors and equipment. The information can be part of submodules of the operands module, and may include target equipment, target sensors in terms of location and type of sensors, and target parameters. Conditional information for each module and submodule dictates application based on requests of the KPI analysis system.

FIG. 1 illustrates an exemplary flowchart for application of the modules of the KPI analysis system. In the embodiment, the desired process KPI check rule 100 is a summation (SUM) check. The KPI check rule 100 looks to the summation of a first frequency of horizontal vibration sensors at locations 2 and 3 from a process with equipment TE02. The desired KPI check rule 100 can be found in the operation module 110 as a summation (SUM) operation. In order to process the operation, the KPI analysis module then looks to the operands module 120 for the specific parameters to be applied.

In relation to the KPI rule, the operands module 120 provides submodules regarding the sensors and equipment that may be used with the KPI operation module 110 to evaluate the KPI rule 100. The operands module 120 may include a target equipment submodule 121, a target sensor submodule 122, a sensor location submodule 123, a sensor type submodule 124, and a target parameter submodule 125. Based on the KPI rule, the necessary information from each submodule can be identified and retrieved for application to the operation. For example, in the KPI rule 100, for the summation of the first frequency of horizontal vibration sensors at locations 2 and 3 from a process with equipment TE02, the system first looks to the identified target equipment, TE02, through the target equipment submodule 121. Following identification of the target equipment, the target sensor can be identified with the target sensor submodule 122. The target sensor submodule 122 can then be used in identification of both sensor location with the sensor location submodule 123 and the sensor type with the sensor type submodule 124. As the necessary sensor information is determined, a target parameter, such as frequency in this example, can be found in the target parameter submodule 125.

By having submodules, the operands module 120 can create an easily used identification or labeling convention to identify parameters of specific sensors. The labeling convention can be used as a generic system for identification of sensors, such that specific parameters can be determined without specific reference to a particularly identified sensor.

For example, in FIG. 1, the operands are defined in the submodules in terms of, H, L2, L3 and F1. Submodule components L2 and L3 respectively define the locations of the sensors, with sensors at locations 2 and 3. Submodule component H of the sensor type submodule defines that the target sensor is in a horizontal direction. Submodule component F1 defines that the target parameter is a frequency of F1. Accordingly, the operands from the operands module that satisfies the conditions of the KPI rule can be identified as H_L2_F1 (a target parameter for frequency F1 for a horizontal sensor at location 2) and H_L3_F1 (a target parameter for frequency F1 for a horizontal sensor at location 3).

In this way, the necessary parameters for a KPI rule can be easily set up based on the naming convention rather than having the specifically callout a sensor based on information such as a serial number. By provisioning sensors based on a naming convention that establishes the placement and abilities of a sensor, the modular KPI analysis system provides adaptability for different KPI requirements as well as sensor or equipment changes. When a KPI rule is changed, the naming convention allows for easily recasting the KPI rule based on the established naming convention.

Additionally, operands submodules can be added or removed in order to meet the necessary requirements of a user or KPI analysis system. The naming convention could be added to or removed from if additional information is necessary. For example, if a particular sensor characteristic besides from sensor type and sensor location were used, a submodule could be added.

In some embodiments, the information for each submodule of the operands module may be comprised of at least one database or data table. By this, each database of each submodule can be accessed for the necessary information of the sensor.

In other embodiments, the submodules of the operands module may be part of a single self-referential data table. In this case, the submodules may actually be a particular field within a single large data table. Variant embodiments could also allow for a combination database for some submodules and separate databases for other submodules.

Due to the hierarchical structure of the submodules, it is envisioned that it will be easy for a user to follow the hierarchy in order to identify which sensor or equipment is out of specification when a KPI value is out of an acceptable range. For example, if the summation of FIG. 1 is out of specification, the KPI of sensors for H_L2_F1 and H_L3_F1 can be compared with their threshold ranges to determine KPI of which sensor or equipment at either location 2 or 3 is out of range. From the modular KPI diagnostic system, the module or submodule that is not within the threshold limits linked to the sensor can be identified, instead of requiring engineers to manually check each equipment to find the one that is out of desired range if it is merely the KPI final value that is being considered. This reduces the complexity of evaluation of the process or workflow.

In one or more embodiments, the KPI diagnostic system will automatically compare each parameter or equipment used in the KPI rule to a preset threshold limit for the parameter or equipment when a KPI value is out of specification. In this way, the KPI diagnostic system can automatically identify the problematic parameter or equipment without requiring an engineer or technician to physically check each sensor or equipment.

Figure 8:
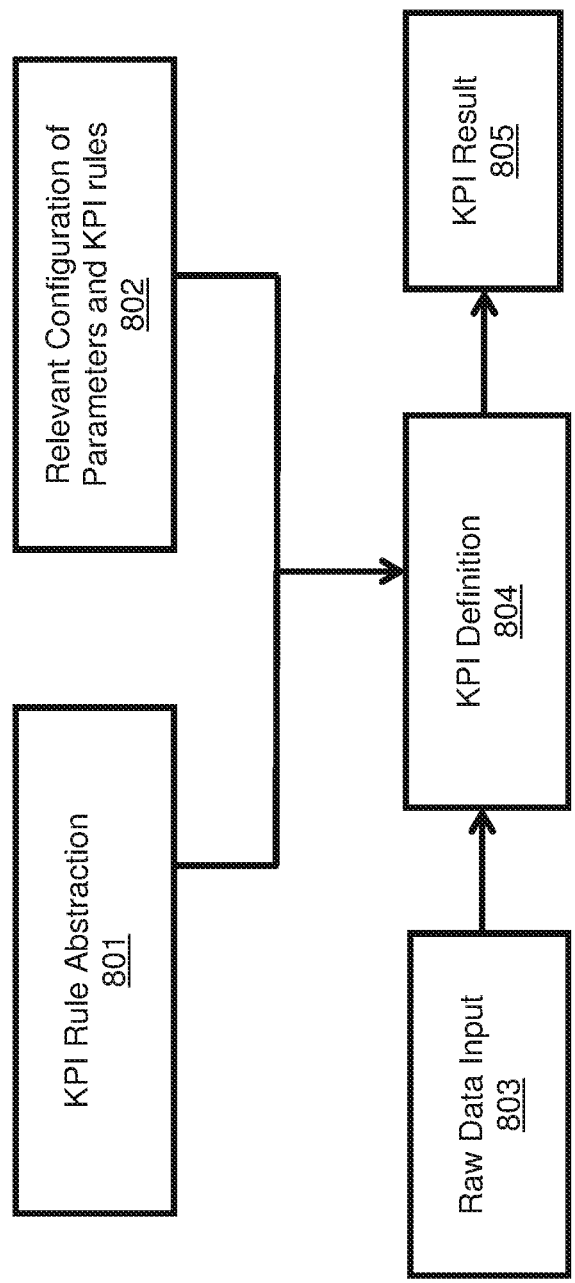
FIG. 8 illustrates an exemplary flowchart for KPI result.
Figure 9:
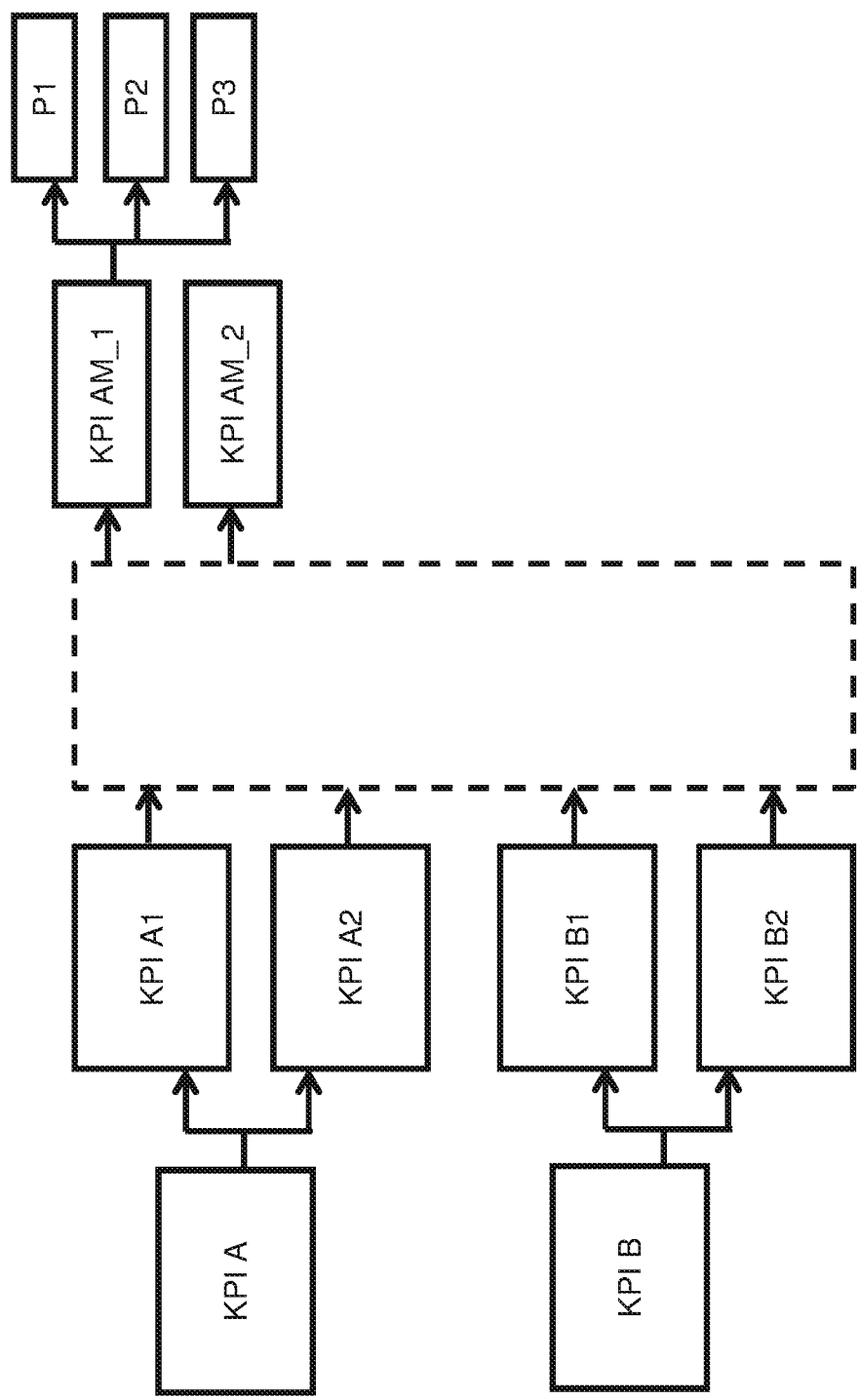
FIG. 9 illustrates an exemplary logical hierarchy of modular KPI arrangement.

FIGS. 8 and 9 illustrate an exemplary flowchart for KPI result calculation and a hierarchical structure of the submodules. FIG. 8 illustrates that the KPI is no longer defined as formula but as the rule combinations of pre-defined foundation rules. User can define their own KPI rule with parameter needed by using configuration that means the KPI formulas are calculated also. By using this method, the calculation engine can easily handle huge number of KPI rule and parameter in well-organized, fine-managed structure/organization. FIG. 8 shows the KPI Rule Abstract 801, Relevant Configuration of Parameters and KPI Rules 802, and Raw Data Input 803 contributing to the formation of the KPI Definition 804 and KPI result 805. FIG. 9 illustrates how such a logical structure may appear for the KPI hierarchy down to specific parameter considerations. If the KPI diagnostic system determines that there is an abnormality, the hierarchical structure allows for following the hierarchy from a high level KPI abnormality down to lower levels. By going down to lower levels, the KPI diagnostic system can eventually determine which equipment is operating abnormally.

In one or more embodiments, the KPI analysis can be applied to different time periods for review, current evaluation, or predictive evaluation. The time periods may be controlled by the user or automatically performed as part of a diagnostic report. The KPI diagnostic system may evaluate three separate time zones or time periods.

In the first time period, T (present time), the KPI diagnostic system evaluates the process or workflow of equipment based on real-time or recently saved information from the sensors.

In the second time period, T−1 (KPI in the past), the KPI diagnostic system can be used to evaluate past saved information from the sensors. It can identify which component caused a failure by performing root cause analysis to identify the particular equipment that is out of specification.

In the third time period, T+1 (KPI in the future), it can be used as lead indication to predict potential failures even when the process is currently operating within specification. As one way, the KPI analysis system may have an option for a warning threshold limit where a particular equipment is still usable but is beginning to deviate from the normal operation range towards the outer bounds of an acceptable operation threshold range. In this way, it can be predicted that the equipment is likely going to fail soon, and the KPI diagnostic method can identify the equipment for maintenance or replacement.

KPI Rule-Building

By using the generic, high level naming convention for sensors, the KPI diagnostic system can be used to both evaluate existing rules as well as provide the ability to configure new KPI rules.

Figure 2:
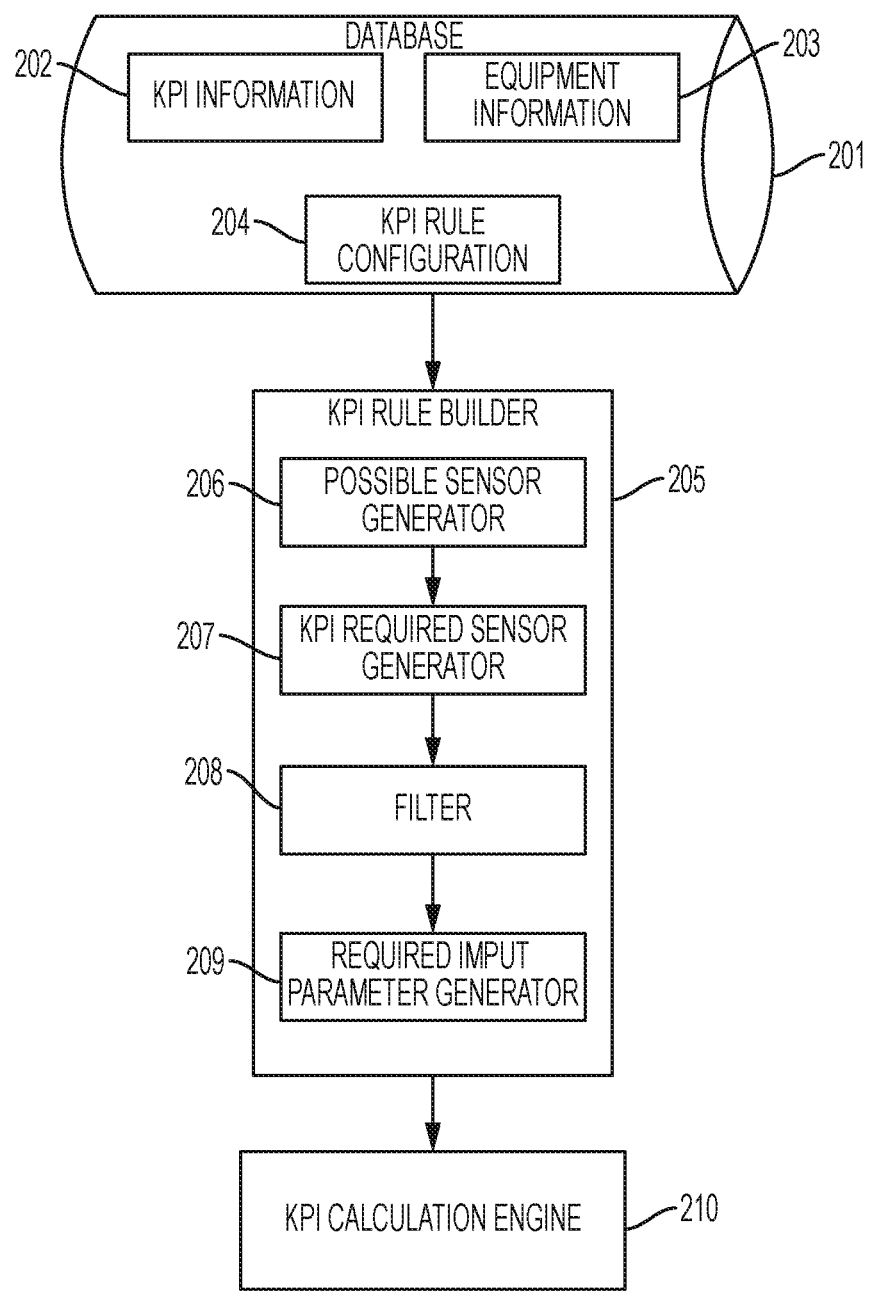
FIG. 2 illustrates a flowchart for the interaction of components for configuring new or updating KPI rules.

FIG. 2 illustrates a flowchart for the interaction of components for configuring new or updating KPI rules. A database 201 may contain the KPI information 202, equipment information 203, and KPI rule configuration 204. This information can be accessed by a KPI rule builder 205.

The KPI rule builder 205 can use a possible sensor generator 206 to determine a pool of available sensors for a target equipment using information from equipment information 203. The KPI rule builder 205 can then determine the KPI required sensors for the target KPI using information from KPI rule configuration 204 and KPI information 202. Next, the KPI rule builder 205 can use a filter 208 to filter the results obtained in the first two steps of determining a pool of available sensors and then determining the KPI required sensors for the target KPI. From the determination of the filter, the KPI rule builder 205 can use a required input parameter generator to define the required operand, or input parameter, by mapping the filtered results with the KPI required sensors. If the possible sensors match with the KPI required sensors, then the KPI rule can be implemented with the KPI calculation engine 210.

Sensors on bearings of equipment can be used to measure parameters, including velocity, acceleration, displacement, and temperature. Each type of sensor measures one parameter type. For equipment with vibration characteristics, velocity or vibration can be in one or more directions. A vibration sensor can be used to measure velocity in at least one direction. Typically, there are three velocity directions: horizontal (H), vertical (V) and axial (A). Alternative coordinate systems may be used to define the directions of movement. A vibration sensor can also provide frequency of the vibration in addition to velocity. Different velocity directions and frequencies are used by KPI rule builder to generate required input parameter(s) to finalize the diagnostic rule.

The KPI rule builder 205 extracts information stored in the database 201. Generally, there are two types of data, metadata and configuration data. Metadata consists of KPI information and equipment information. Configuration data consists of a collection of KPI rule configurations, which may also include a master rule direction configuration. The data of KPI information, equipment information, KPI rule configuration and master rule direction configuration provide essential information that is used in generating a KPI rule.

The KPI rule builder 205 extracts information from the provided data to generate the required input parameters or directions. This parameter is used as an operand to generate final KPI calculation rule. After that, live data or raw data are used to give the required KPI. Operands are defined by a set of conditions defining the target equipment. For each target equipment, the target sensors are identified. For each target sensor, the sensor location and sensor type (e.g. direction for vibrating sensor) are identified.

Metadata

Metadata consists of KPI information 202 and equipment information 203.

KPI information 202 can include KPI name and KPI code. The KPI information can be stored in a KPI information data table. Each KPI has an identifier (KPI code) which is used to identify the relevant KPI rule configuration. During execution, the identifier in the KPI information data table is used to find the corresponding KPI rule configuration which has the same identifier.

Equipment information 203 provides information about sensors on the equipment of the process. The information may include machine or equipment naming, bearing location, the number of sensors on the bearing, and maximum and minimum number of sensors on the bearing. The bearing location numbers are the locations, or positions, of the sensor bearings on the equipment. The number of sensors on each bearing is a count of the number of sensors available. The maximum numbers of bearings can be used for validation purpose. For example, if the maximum number of bearings is 4, but there are sensors for five bearings, this indicates an error and a need to check the database to ensure the information is correct.

Configuration Data

The equipment information 203 can also include master rule direction configuration data. This can provide general information about the sensors that are attached to equipment, for example types of sensors. For example, for equipment with vibrating sensors, the available directions of the sensors (e.g. H, V, A) are provided. The master rule direction configuration data can provide a list of sensors and their orientations.

For example, with vibrating sensors, the order of H, V, and A is not necessarily randomly assigned. It can be set by the user or by the KPI diagnostic system. The order corresponds to the sensor information.

As an example, if the order of vibrating sensors is defined as H, V, A, then the sequence of correspondence can be set. If user defines that when there is only one sensor on a bearing for equipment (sensor here is not physical sensor, but defined in logic), the sensor corresponds to H (not V or A). If the user defines two sensors on a bearing, then the sensors correspond to H and V. Finally, if the user defines three sensors on a bearing, the sensors correspond to H and V and A.

Alternatively, if the order of vibrating sensors is defined as A, H, V, then the sequence would be difference. If user defines that when there is only one sensor on a bearing for equipment, the sensor corresponds to A. (not H or V). If the user defines two sensors on a bearing, the sensors correspond to A and H. Finally, if the user defines three sensors on a bearing, the sensors correspond to A and H and V.

As such, the master rule direction configuration can provide general information. The information can be integrated into the equipment information database 203 such that the number of sensors on the bearing can be represented in terms of H, V and A in the defined order.

KPI rule configuration 204 includes a predefined list of KPI rule configuration items. KPI rule configuration data includes information that is relevant to finding input parameters for the desired KPI operation.

Each KPI rule configuration is predefined, and there is no need to change the predefined configuration items for the KPI rule builder to function. When there is a change in the KPI rule, equipment or process conditions, the user or the diagnostic software can change the parameters of the configuration items. When there is a change to the equipment, the user only needs to change the configuration item parameters. Accordingly, the small number of changes possible to the KPI rule configuration reduces the risk of trouble from changing the code to facilitate KPI calculation. This can minimize the chance of error when making changes for different environments, such as different processes or different process conditions. Also, this provides flexibility to the users and improves efficiency of the engineering process as it lessens the amount of training and oversight necessary to effect changes to the KPI analysis.

This configuration data contains a list of configuration items. A KPI rule configuration list may include an identifier, an operation and an item used to find an operand. The item can be based from sensor, direction, bearing location, frequency, alternative bearing location and alternative frequency.

There can be several different KPI associated with equipment. Each KPI is calculated in the diagnostic engine using a different formula. As such, there are multiple KPI rule configurations, each KPI rule configuration having a different formula. Additionally, each formula has an operation and at least one operand. Accordingly, the KPI rule configuration 204 can be used to calculate different KPIs.

Based on the identifying information stored in the KPI information data table for the target KPI, a relevant KPI rule configuration having the same identifier is determined. Based on the equipment information and the relevant KPI rule configuration, the operation and the operand is determined. The KPI rule builder 205 then generates the KPI rule based on the relevant KPI rule configuration, the determined operation and the operand. The configuration items listed in the KPI rule configuration are used to find the operands, or required input parameters. The KPI rule builder uses operand and the operation in the KPI rule configuration to generate the required KPI calculation rule. The KPI rule can then be used for calculation of the target KPI in the diagnostic engine.

Steps for KPI Rule Building

Figure 3:
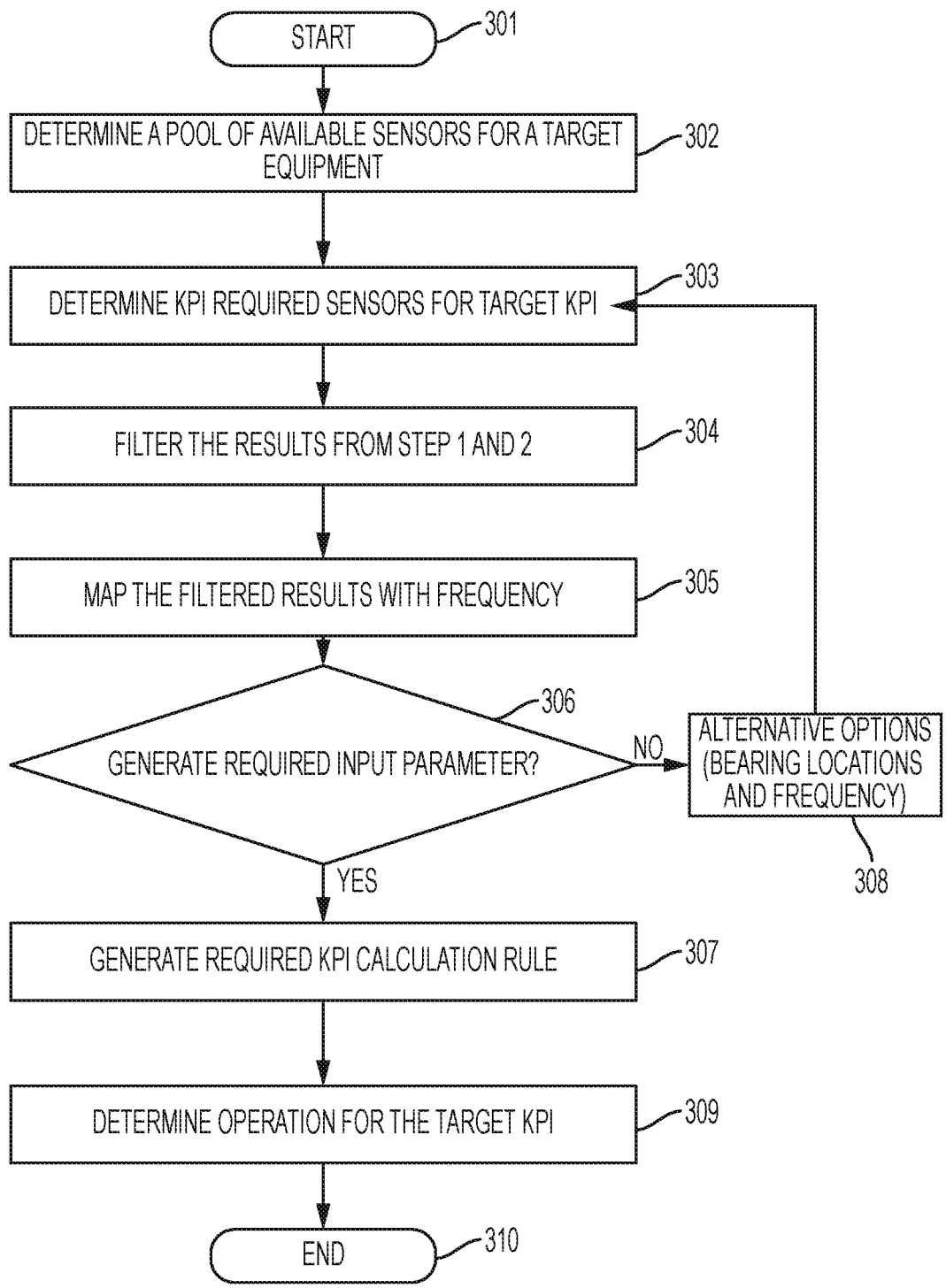
FIG. 3 illustrates a flowchart of generating new KPI rules based on the available information for operations and operands.
Figure 4:
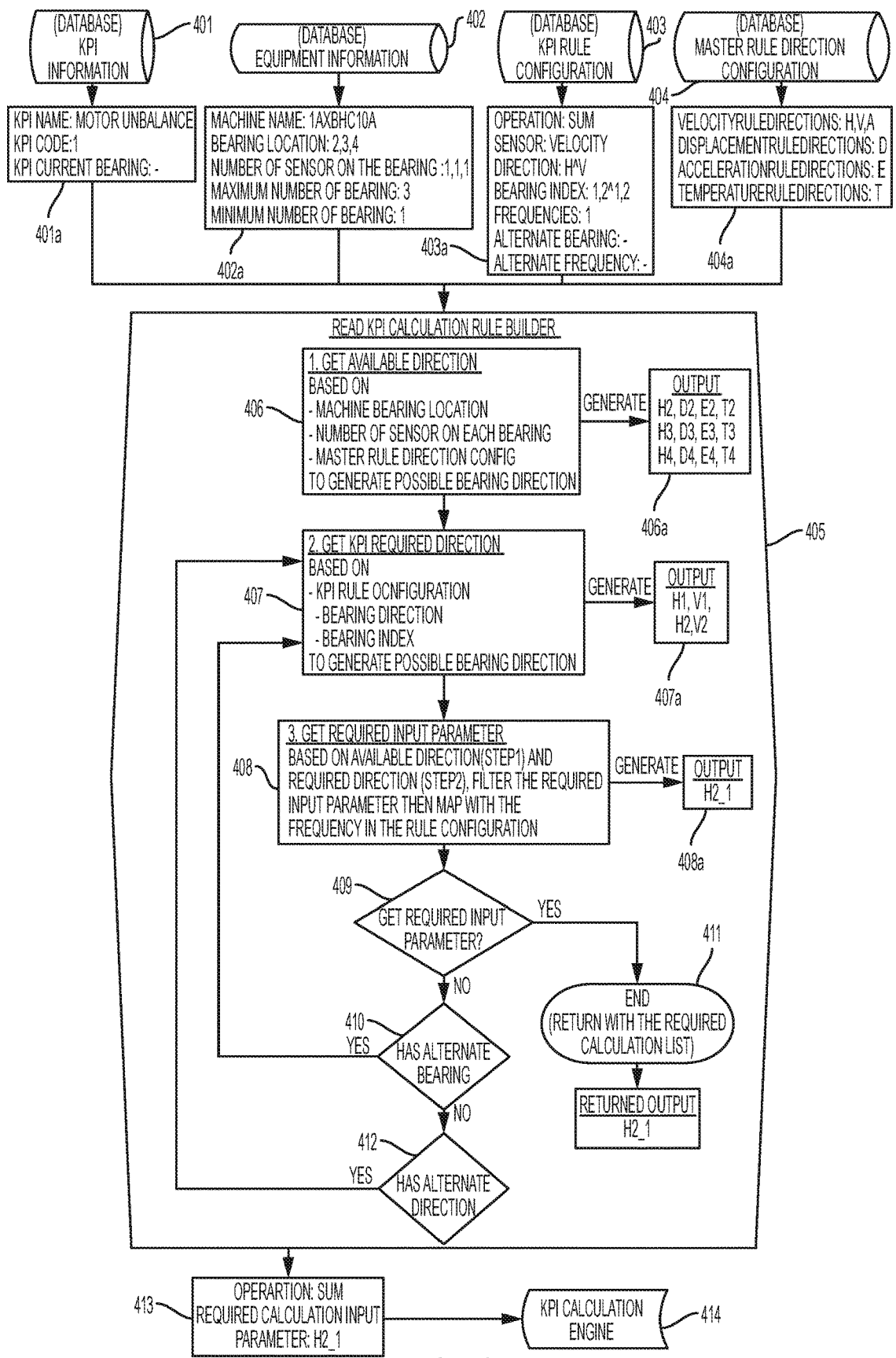
FIG. 4 illustrates a detailed flowchart of generating new KPI rules based on the available information for operations and operands.

FIGS. 3 and 4 illustrate flowcharts of generating new KPI rules based on the available information for operations and operands. FIG. 3 illustrates a higher level explanation whereas FIG. 4 illustrates a more detailed explanation.

In FIG. 3, the method starts 301 with determining (302) a pool of available sensor parameters for target equipment that is used to filter relevant KPI parameters. Next, it is necessary to find relevant KPI parameters for target KPI (303). From the first two steps of determining the pool of sensors and finding the necessary KPI parameters, the results can be filtered (304) to identify potential parameters, or operands, for use in a KPI rule. Then the pool of sensors can be mapped to the parameters (305) and a determination can be made as to whether the required input parameter for the KPI rule is provided (306). In the example of FIG. 3, the mapping is of the filtered results with a required input for frequency. If the required input parameter is generated, then the KPI calculation rule with the operand can be generated (307) and the operation for the KPI rule can be determined (309) to end the configuration process (310). If the required input parameter cannot be generated, then the KPI diagnostic system may look for alternative options for the KPI rule, using alternate bearing locations and required input parameters (308).

FIG. 4 illustrates a detailed flowchart of generating new KPI rules based on the available information for operations and operands.

Information 401a-404a can be accessed from the KPI information 401, equipment information 402, KPI rule configuration (403), and master rule direction configuration (404). As a first step, the KPI rule builder 405 determines (406) a pool of available parameters for target equipment that is later used to filter relevant KPI parameters. This generates an output of the pool (406a). One method of implementing step one including looking at equipment information data to obtain machine bearing location and numbers of sensors on each bearing. The master rule direction configuration (404) or equipment information (402) can be used to identify the sensor types (direction) available (velocity rule directions [H, V, A], displacement rule directions [D], acceleration rule directions [E] and temperature rule directions [T]). From the information obtained and identified, all the available sensor types can be identified. For example, in FIG. 4, based on equipment information, bearing locations are 2, 3, and 4 and the numbers of sensors are 1, 1, and 1. From the master rule direction configuration (404), the available direction for the vibration sensor (velocity direction) is H since there is only 1 sensor. The other sensors D, E, T are always present for the equipment. Thus all the possible sensors (bearing directions) are:

location 2: H2, D2, E2, T2
location 3: H3, D3, E3, T3
location 4: H4, D4, E4, T4

Then, the KPI required sensors for the target KPI rule can be found (407). The KPI rule configuration (403) can be accessed to obtain sensor type (direction) and bearing index (bearing location). Based on the information obtained, KPI parameters can be generated for the target KPI, such as required sensor type at the required location and the required directions. From the KPI rule configuration (403) for the target KPI, the required sensor types (bearing directions) are H and V, and the sensor locations (bearing index) are 1 and 2. Thus, all the possible sensors (directions) generated are:

location 1: H1, V1,
location 2: H2, V2

Filtering (408) to identify potential parameters, or operands, for use in a KPI rule can be performed from the first two steps of determining the pool of sensors (406) and finding the necessary KPI parameters (407). Then the pool of sensors can be mapped to the parameters and a determination can be made as to whether the required input parameter for the KPI rule is provided (409). If the required input parameter is generated, then the KPI calculation rule with the operand can be generated (411) and the operation for the KPI rule can be determined (413) to end the configuration process with the ability to send the operation and operand to the KPI calculation engine (414). For example, in FIG. 4, comparing the output from 1.2.4 and 2.2.3, H2 is the only common direction that is present in the two outputs of the first two steps. After this filtering, H2 is the retained sensor. When mapped with the frequency which is 1, the final required output parameter is H2_1.

If the required input parameter cannot be generated, then the KPI diagnostic system may look for alternative options for the KPI rule, using alternate bearing locations (410) and required input parameters (412). The alternative bearings and alternative directions may be used to generate the required parameter. After obtaining required input parameters, they are inserted to the operation inside the KPI rule configuration to generate KPI rule formula.

Figure 5:
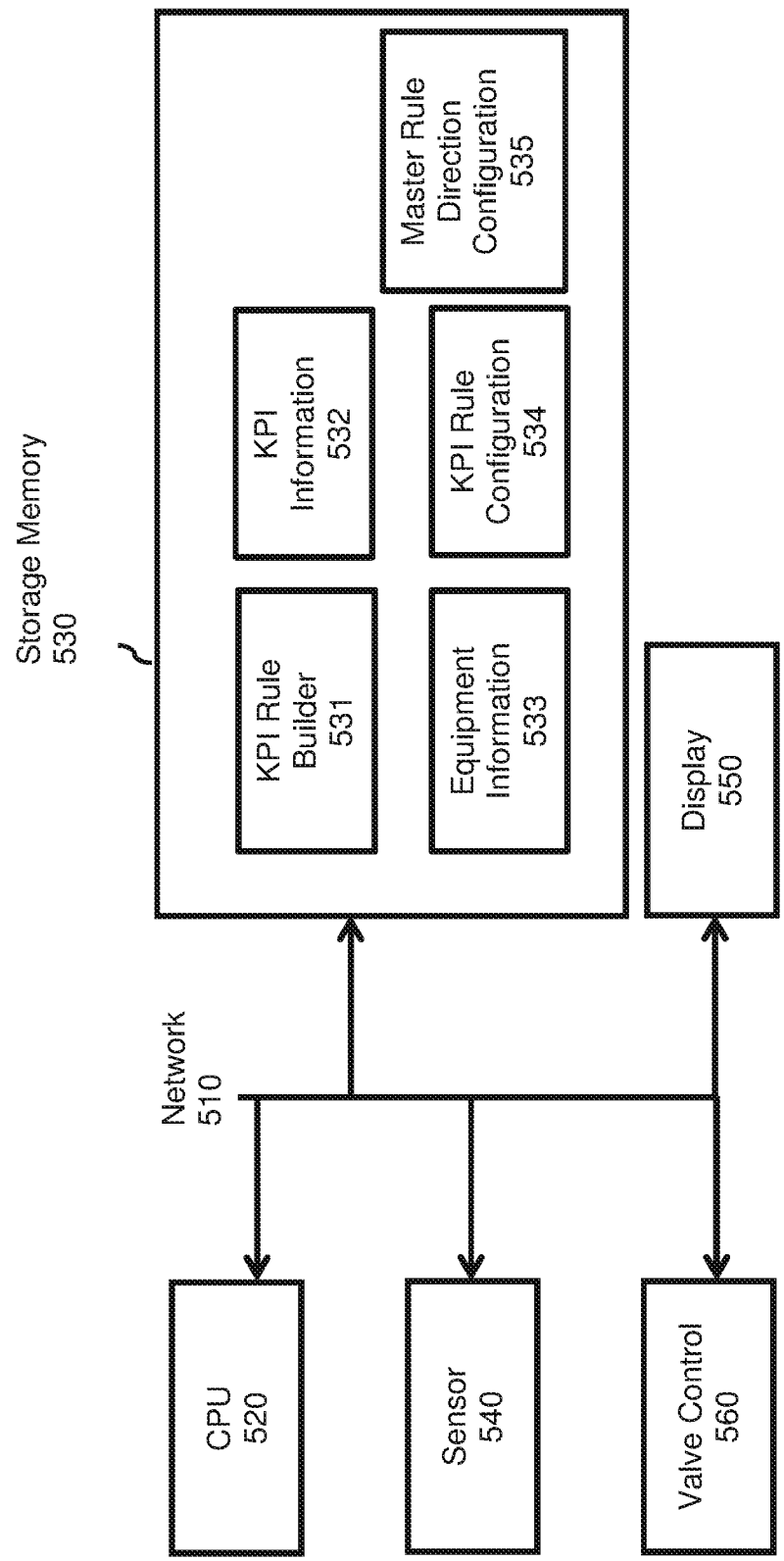
FIG. 5 illustrates an exemplary KPI diagnostic system architecture.

FIG. 5 illustrates an embodiment of the KPI diagnostic system. The KPI diagnostic system may include at least one central processing unit (CPU) and a non-transitory computer readable storage medium. The CPU is configured to execute program code that is stored on the storage medium to perform the KPI diagnostic. The storage medium may comprise of the program code, and may also include the code for the database information. Alternatively, the database information may be stored on separate storage mediums.

Figure 6:
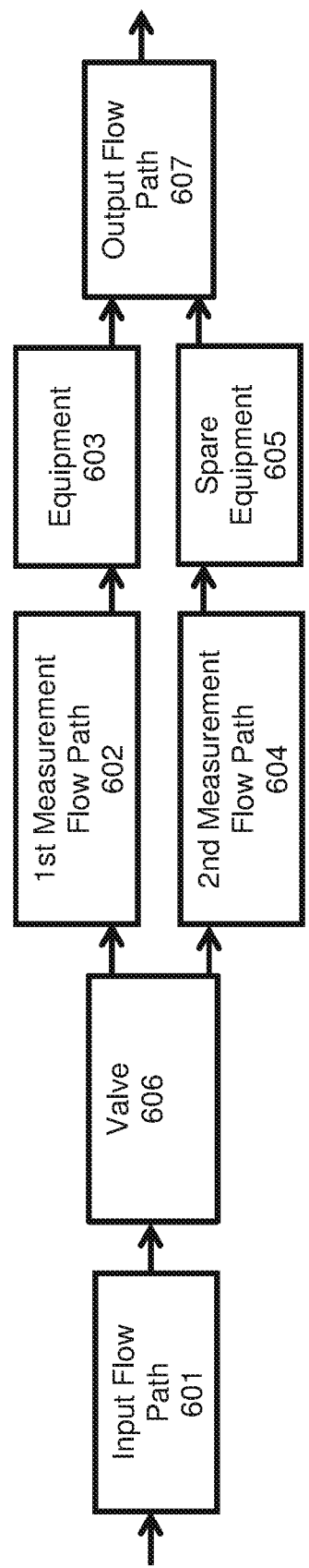
FIG. 6 illustrates an exemplary scenario of automatic diversion of a flow path of a process.

FIG. 6 shows an exemplary embodiment showing an automatic diversion of a flow path based on the KPI diagnostic system. The process may have an input flow path 601 and be originally routed through a first measurement flow path 602 having a first equipment 603. In the event that the KPI diagnostic system diagnoses that the first equipment 603 has failed or is predicted to fail, the process may be rerouted through a second measurement flow path 604 having a spare equipment 605. This rerouting may be achieved through a valve or switch 606. The rerouting may flow through an entirely different output flow path or may be routed back to a common output flow path 607.

Figure 7:
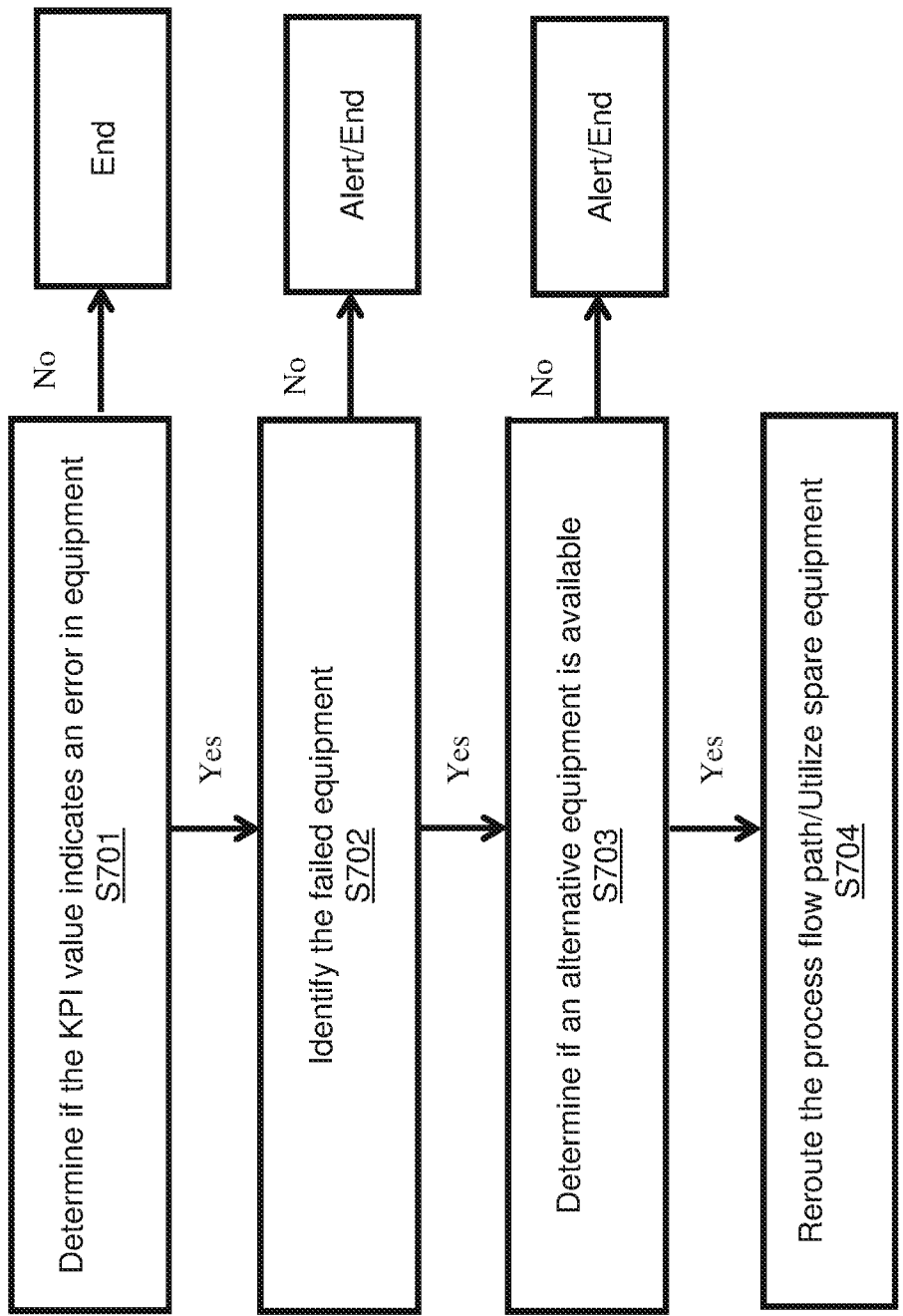
FIG. 7 illustrates an exemplary flowchart for automatic diversion of a flow path of a process.

FIG. 7 shows an exemplary flowchart for determining the automatic diversion of a flow path based on the KPI diagnostic system. After implementation of a KPI diagnostic rule, the determination (S701) may be made that a KPI indicates an error in an equipment. The KPI diagnostic system can then use the hierarchical arrangement of the system to identify (S702) the specific equipment that has failed. If the failed equipment is determined to be in a portion of the process with an alternative equipment (S703), the system can reroute the process to utilize the spare equipment (S704).

In some embodiments of the KPI diagnostic system, the system may automatically adjust an input variable of the industrial process when the output result exceeds the preset threshold alert value in order to correct the excessive output result.

Although this specification has been described above with respect to the exemplary embodiments, it shall be appreciated that there can be a variety of permutations and modifications of the described exemplary features by those who are ordinarily skilled in the art without departing from the technical ideas and scope of the features, which shall be defined by the appended claims.

A method of one or more exemplary embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a computer.

While this specification contains many features, the features should not be construed as limitations on the scope of the disclosure or of the appended claims. Certain features described in the context of separate embodiments can also be implemented in combination. Conversely, various features described in the context of a single exemplary embodiment can also be implemented in multiple exemplary embodiments separately or in any suitable sub-combination.

Also, it should be noted that all embodiments do not require the distinction of various system components made in this description. The device components and systems may be generally implemented as a single software product or multiple software product packages.

A number of examples have been described above. Nevertheless, it is noted that various modifications may be made. For example, suitable results may be achieved if the described techniques are performed in a different order and/or if components in a described system, architecture, or device are combined in a different manner and/or replaced or supplemented by other components or their equivalents. Accordingly, other implementations are within the scope of the following claims.

There is claimed:

1. A method comprising:
    reading, from a database by at least one processor operating according to program code read from a storage, equipment information of a target equipment in an industrial process;
    obtaining, by the at least one processor, sensor information of a plurality of sensors attached to the target equipment including a location of the sensors attached to the target equipment, a number of sensors at each location, and a sensor type of each sensor, from the equipment information;
    reading, by the at least one processor, key performance indicator (KPI) rule configuration information from the database;
    obtaining, by the at least one processor, sensor types of KPI required sensors and locations of the KPI required sensors on the target equipment for a target KPI rule, from the KPI rule configuration information;
    comparing, by the at least one processor, the sensor types and the locations of the required KPI sensors with the locations, the number of sensors, and the sensor types of the plurality of sensors attached to the target equipment to determine whether one or more sensors of the plurality of sensors are able to provide KPI required parameters for the target KPI, rule;
    in response to determining that the one or more sensors are able to provide the KPI required parameters, mapping, by the at least one processor, the sensor types and locations of the one or more sensors to input parameters of the target KPI rule and determining an operation to apply to the input parameters based on the KPI rule configuration information;
    generating, by the at least one processor, a KPI diagnostic rule based on the KPI rule configuration information, the input parameters and the operation;
    calculating a KPI of the target equipment using the generated KPI diagnostic rule and sensor data from the one or more sensors;
    comparing the calculated KPI with a threshold alert value; and
    generating an alert in response to the calculated KPI exceeding the threshold alert value.

2. The method according to, further comprising:
    automatically diverting a flow path of the industrial process through another equipment in response to the calculated KPI exceeding the threshold alert value.

3. The method according to claim 1, wherein determining the input parameters comprises:
    mapping each of the one or more sensors to a parameter indicated by the KPI rule configuration information; and
    determining the parameter as the input parameter.

4. The method according to claim 3, wherein, in response to determining that the one or more sensors are not able to provide the KPI required parameters, evaluating alternative options for the KPI diagnostic rule.

5. The method according to claim 1, wherein the equipment information comprises logical information regarding a hierarchical level of the target equipment with respect to a plurality of equipment within the industrial process.

6. The method according to claim 1, further comprising:
    automatically adjusting an input variable of the industrial process in response to the calculated KPI exceeding the threshold alert value to change the calculated KPI to within the threshold alert value.

7. A system comprising:
a plurality of sensors attached to an equipment in an industrial process;
at least one non-transitory computer readable storage medium operable to store program code;
at least one processor operable to read said program code and operate as instructed by the program code, the program code comprising code to:
read, from a database, equipment information of a target equipment in an industrial process;
obtain sensor information of a plurality of sensors attached to the target equipment including a location of the sensors attached to the target equipment, a number of sensors at each location, and a sensor type of each sensor, from the equipment information;
read, from the database, key performance indicator (KPI) rule configuration information;
obtain sensor types of KPI required sensors and locations of the KPI required sensors on the target equipment for a target KPI rule, from the KPI rule configuration information;
compare the sensor types and the locations of the required KPI sensors with the locations, the number of sensors, and the sensor types of the plurality of sensors attached to the target equipment to determine whether one or more sensors of the plurality of sensors are able to provide KPI required parameters for the target KPI;
in response to determining that the one or more sensors are able to provide the KPI required parameters, map the sensor types and locations of the one or more sensors to input parameters of the target KPI rule and determine an operation to apply to the input parameters based on the KPI rule configuration information;
generate a KPI diagnostic rule based on the KPI rule configuration information, the input parameters and the operation;
calculate a KPI of the target equipment using the generated KPI diagnostic rule and sensor data from the one or more sensors;
compare the calculated KPI with a threshold alert value; and
generate an alert in response to the calculated KPI exceeding the threshold alert value.

8. The system according to claim 7, the program code further comprising code to:
automatically divert a flow path of the industrial process through another equipment in response to the calculated KPI exceeding the threshold alert value.

9. The system according to claim 7, wherein determining the input parameters comprises code to:
map each of the one or more sensors to a parameter indicated by the KPI rule configuration information; and
determine the parameter as the input parameter.

10. The system according to claim 7, the program code further comprising code to:
in response determining that the one or more sensors are not able to provide the KPI required parameters, evaluate alternative options for the KPI diagnostic rule.

11. The system according to claim 7, wherein the equipment information comprises logical information regarding a hierarchical level of the equipment with respect to a plurality of equipment within the industrial process.

12. The system according to claim 7, the program code further comprising code to:
automatically adjusting an input variable of the industrial process in response to the calculated KPI exceeding the threshold alert value to change the calculated KPI to within the threshold alert value.

* * * * *